(12) United States Patent
Granstrom et al.

(10) Patent No.: US 9,852,224 B2
(45) Date of Patent: Dec. 26, 2017

(54) PROMOTING PREFERRED CONTENT IN A SEARCH QUERY

(71) Applicant: Google Inc., Mountain View, CA (US)

(72) Inventors: Johan Granstrom, Canton of Zurich (CH); Matthias Konrad, Zurich (CH); Thomas Weich, Canton of Zurich (CH)

(73) Assignee: Google LLC, Mountain View, CA (US)

( * ) Notice: Subject to any disclaimer, the term of this patent is extended or adjusted under 35 U.S.C. 154(b) by 238 days.

(21) Appl. No.: 14/323,104

(22) Filed: Jul. 3, 2014

(65) Prior Publication Data

US 2016/0004777 A1    Jan. 7, 2016

(51) Int. Cl.
*G06F 17/30* (2006.01)

(52) U.S. Cl.
CPC .............................. *G06F 17/30867* (2013.01)

(58) Field of Classification Search
CPC ..................... G06F 17/30867; G06F 17/30864
USPC ... 707/E17.108, E17.014, 999.003, E17.109, 707/706, 728, 769, 722, 723, 758, 707/999.001, 999.005, E17.002, E17.009, 707/705, 741, E17.005, E17.044, 707/E17.119, E17.12, 692, 709, 710, 711, 707/724, 732, 736, 737, 738, 740, 748, 707/749, 752, 754, 759, 767, 803, 707/999.007, 999.1, 999.102, 999.103; 701/533, 468, 412, 417, 426, 516; 705/10, 14.56, 14.73, 7.11, 7.39, 14.41, 705/14.47, 14.49, 14.53, 14.54, 14.58, 705/14.61, 14.69, 26.1, 26.35, 26.5, 705/26.64, 26.81, 27.1, 28, 30, 318, 319, 705/36 R, 37, 38, 400, 7.33; 709/226, 709/204, 223, 224, 221, 225
See application file for complete search history.

(56) References Cited

U.S. PATENT DOCUMENTS

| | | | |
|---|---|---|---|
| 5,583,763 A | | 12/1996 | Atcheson et al. |
| 5,920,859 A | * | 7/1999 | Li .................. G06F 17/3061 |
| | | | 707/711 |
| 7,571,157 B2 | * | 8/2009 | Chowdhury ...... G06F 17/30634 |

(Continued)

FOREIGN PATENT DOCUMENTS

| WO | WO 01/91015 | * 11/2001 | ............. G06F 17/60 |
|---|---|---|---|
| WO | 2008058093 | 5/2008 | |

(Continued)

OTHER PUBLICATIONS

International Search Report for and Written Opinion of the International Searching Authority for International Patent Application No. PCT/US2015/037501 dated Sep. 16, 2015, 10 pages.

*Primary Examiner* — Jay Morrison
*Assistant Examiner* — Ken Hoang
(74) *Attorney, Agent, or Firm* — Lowenstein Sandler LLP (57) ABSTRACT

A method for promoting preferred content in a search query is disclosed. The method includes obtaining a search result set of content items from a corpus of content items, the search result set responsive to a search query and comprising a rank of the content items, identifying content items in the search result set, the identified content items comprising at least a preferred content item uploaded by a user, adjusting, by a processing device, a position of the preferred content item with respect to a position of a claimed content item in the rank of the content items within the search result set, the claimed content item claimed by the user.

21 Claims, 9 Drawing Sheets

(56) References Cited

U.S. PATENT DOCUMENTS

| | | | |
|---|---|---|---|
| 7,634,475 B1 | 12/2009 | Hernek | |
| 8,051,076 B1 | 11/2011 | Garg et al. | |
| 8,538,970 B1 | 9/2013 | Tucker | |
| 2003/0093338 A1* | 5/2003 | Kim | G06Q 30/02 |
| | | | 705/26.7 |
| 2006/0059128 A1 | 3/2006 | Ruggle et al. | |
| 2007/0261071 A1* | 11/2007 | Lunt | G06Q 10/10 |
| | | | 725/13 |
| 2008/0059461 A1* | 3/2008 | Brock | G06F 17/3002 |
| 2009/0144325 A1 | 6/2009 | Chastagnol et al. | |
| 2010/0185650 A1* | 7/2010 | Topatan | G06F 17/30011 |
| | | | 707/769 |
| 2010/0199219 A1 | 8/2010 | Poniatowski et al. | |
| 2010/0241624 A1* | 9/2010 | Ramsey | G06F 17/30696 |
| | | | 707/732 |
| 2012/0136853 A1* | 5/2012 | Kennedy | G06F 17/30038 |
| | | | 707/723 |
| 2012/0215773 A1 | 8/2012 | Si et al. | |
| 2013/0097089 A1 | 4/2013 | Steele | |
| 2014/0020116 A1 | 1/2014 | Chastagnol et al. | |
| 2015/0169633 A1* | 6/2015 | Yee | G06F 17/3028 |
| | | | 707/723 |

FOREIGN PATENT DOCUMENTS

| | | |
|---|---|---|
| WO | 2012174632 A1 | 12/2012 |
| WO | 2013173805 | 11/2013 |

\* cited by examiner

Receive search result set including content items identified as relevant to a search query submitted by a user of a content sharing platform
510

Identify in the search result set preferred user content items ("preferred content items") and claimed content items of the preferred user
520

Calculate boost factor, F, based on the number, position, and score of content items claimed by the preferred user that are in the search result set
530

Apply calculated boost factor F to the preferred content item(s) to increase relevancy score of preferred content item(s) in the search result set
540

Receive search result set including content items identified as relevant to a search query submitted by a user of a content sharing platform
610

Identify in the search result set preferred user content items ("preferred content items") and claimed content items of the preferred user
620

Calculate boost factor, F, based on the number, position, and score of content items claimed by the preferred user that are in the search result set
630

Apply calculated boost factor F to the claimed content item(s) to decrease relevancy score of claimed content item(s) in the search result set
640

Receive search result set including content items identified as relevant to a search query submitted by a user of a content sharing platform
710

Identify in the search result set preferred user content items ("preferred content items") and claimed content items of the preferred user
720

Assign value, Vp, to preferred user indicating preferred user's value of view on preferred content item vs. claimed content item
730

Assign average change, C[R], for each ranked content item in the search result set, where the average chance C[R] represents the probability that a user selects the content item ranked R from the search result set
740

Determine optimal rankings of preferred content items and claimed content items that results in highest preferred user utility value, where the preferred user utility value is calculated based on the assigned value Vp and the assigned average chance for the preferred content items and the claimed content items of the preferred user
750

PROMOTING PREFERRED CONTENT IN A SEARCH QUERY

TECHNICAL FIELD

This disclosure relates to the field of content sharing platforms and, in particular, to promoting preferred content in a search query.

BACKGROUND

On the Internet, social networks allow users to connect to and share information with each other. Many social networks include a content sharing aspect that allows users to upload, view, and share content, such as video content, image content, audio content, text content, and so on (which may be collectively referred to as "media items" or "content items"). Such media items may include audio clips, movie clips, TV clips, and music videos, as well as amateur content such as video blogging, short original videos, pictures, photos, other multimedia content, etc. Users may use computing devices (such as smart phones, cellular phones, laptop computers, desktop computers, netbooks, tablet computers) to use, play, and/or consume media items (e.g., watch digital videos, and/or listen to digital music).

Social networks may provide a search engine to identify content items that are relevant to a searching user's search query and to present the content items in a manner that is most useful to the searching user. The search engine aims to provide links to high-quality, relevant results to the searching user's search query. In an attempt to increase the relevancy and quality of the content items returned to the searching user, the search engine may attempt to sort the list of hits so that the most relevant and/or highest quality pages are at the top of the list of hits returned to the searching user. However, these factors alone may not be sufficient for social networks providing content item sharing (e.g., where one or more other users of the social network may upload and/or own content items returned in the search results).

SUMMARY

The following is a simplified summary of the disclosure in order to provide a basic understanding of some aspects of the disclosure. This summary is not an extensive overview of the disclosure. It is intended to neither identify key or critical elements of the disclosure, nor delineate any scope of the particular implementations of the disclosure or any scope of the claims. Its sole purpose is to present some concepts of the disclosure in a simplified form as a prelude to the more detailed description that is presented later.

In one implementation, a method for promoting preferred content in a search query is disclosed. The method includes obtaining a search result set of content items from a corpus of content items, the search result set responsive to a search query and comprising a rank of the content items, identifying content items in the search result set, the identified content items comprising at least a preferred content item uploaded by a user, and adjusting, by a processing device, a position of the preferred content item with respect to a position of a claimed content item in the rank of the content items within the search result set, the claimed content item claimed by the user.

In one implementation, the claimed content item includes a content item owned by the user but uploaded by another user, and wherein the corpus of content items maintained by a content sharing platform to which the user and the another user belong. In addition, the adjusting the position of the preferred content item in the rank of the method may further comprise interchanging the positions of the preferred content item and the claimed content item in the rank of the content items. In another implementation, the interchanging occurs when a difference in a relevancy score attributed to each of the preferred content item and the claimed content item for the rank is less than or equal to a threshold difference value.

In some implementations, the adjusting the position of the preferred content item in the rank further comprises increasing a relevancy score of the preferred content item by a boost factor that is calculated based on another relevancy score attributed to the claimed content item for the rank, wherein the relevancy score of the preferred content item corresponds to a position of the preferred content item in the rank, and wherein the another relevancy score of the claimed content item corresponds to a position of the claimed content item in the rank. Furthermore, the content items in the search result set comprise more than one claimed content item claimed by the user, and wherein the boost factor is calculated based on the sum of the relevancy scores attributed to each of the more than one claimed content items, positions of the more than one content items in the rank, and the position of the preferred content item in the rank.

In a further implementation, the adjusting the position of the preferred content item in the rank of the method further comprises demoting the claimed content item. The demoting the claimed content item may further include reducing a relevancy score of the claimed content item by a multiplier that is less than one, wherein the relevancy score of the claimed content item corresponds to a position of the claimed content item in the rank. In addition, the adjusting the position of the preferred content item in the rank of the method may further include assigning the positions of the preferred content item and the claimed content item in the rank based on a function that optimizes a utility of the user, the utility of the user based on a value that the user applies to a view on a content item uploaded by the user as compared to a view on a content item claimed by the user.

In additional implementations, computing devices for performing the operations of the above described implementations are also disclosed. Additionally, in implementations of the disclosure, a computer readable storage media stores methods for performing the operations of the above described implementations.

BRIEF DESCRIPTION OF THE DRAWINGS

The present disclosure is illustrated by way of example, and not by way of limitation, in the figures of the accompanying drawings.

DETAILED DESCRIPTION

Implementations are described for promoting preferred content in a search query. Preferred content may refer to one or more content items uploaded by a preferred user (e.g., a user owning content that they uploaded to their own channels on the content sharing platform). In some implementations, a preferred user includes a partner user of a content sharing platform. In other implementations, preferred content may include original uploads, uploads having a predetermined quality (e.g., resolution), and so on.

Implementations of the disclosure may promote the preferred content in the context of preferred user-claimed content. Claimed content may refer to one or more content items uploaded by other users of the content sharing platform and claimed by the preferred user (e.g., to track the use of the content item and/or to monetize viewing of the content item by users). For example, a preferred user may own several content items about a certain topic and allow other users to upload copies of these content items while the preferred user tracks use of the claimed content items and/or monetizes use of the claimed content items.

In some implementations, a user may submit a search query for specific content from a corpus of content hosted by the content sharing platform. A corpus may refer to a large and structured set of content items maintained by the content sharing platform. Search engine system may receive the search query and return a search result set of content items relevant to the search query. The content items in this search result set may be ranked in terms of relevancy to the search query. The search results set may also include both preferred content and claimed content that is relevant to the search query. In such cases, it can be beneficial for both the preferred user and the search quality of the search result set to promote the preferred content or demote the claimed content so that the claimed content is ranked below the preferred content in the search result set. This promotion/demotion is motivated by three observations: (1) the preferred user could have issued a block policy instead of a monetization or track policy, to direct more traffic towards their own content items; (2) the preferred user values a view on a content item uploaded on their own channels higher than a monetized view on a user content item, even if the monetary compensation is the same; and (3) users searching for content items often prefer authoritative versions uploaded by preferred users over monetized claimed content items.

The search engine system of implementations of the disclosure performs such promotions/demotions of the preferred content within the search result set. In implementations of the disclosure, the adjustments to the preferred content with the search result set may be performed by search engine system and may optimize the preferred user's value within the content sharing platform system without negatively effecting the search quality.

Previous solutions have not been provided to promoting preferred content in a search query. Some related solutions have promoted preferred content items among duplicate content items in a cluster of content items. However, implementations of the present disclosure provide a broader scope than previous solutions by promoting preferred uploaded content items over monetized or tracked content items in situations where there is not a full match between the preferred uploaded content item and the claimed content items. Furthermore, implementations of the disclosure can promote a preferred content item over a claimed content item by the same preferred user even if there is no match at all between the two content items (as the criterion is that the content items be relevant to the same search query).

Figure 1:
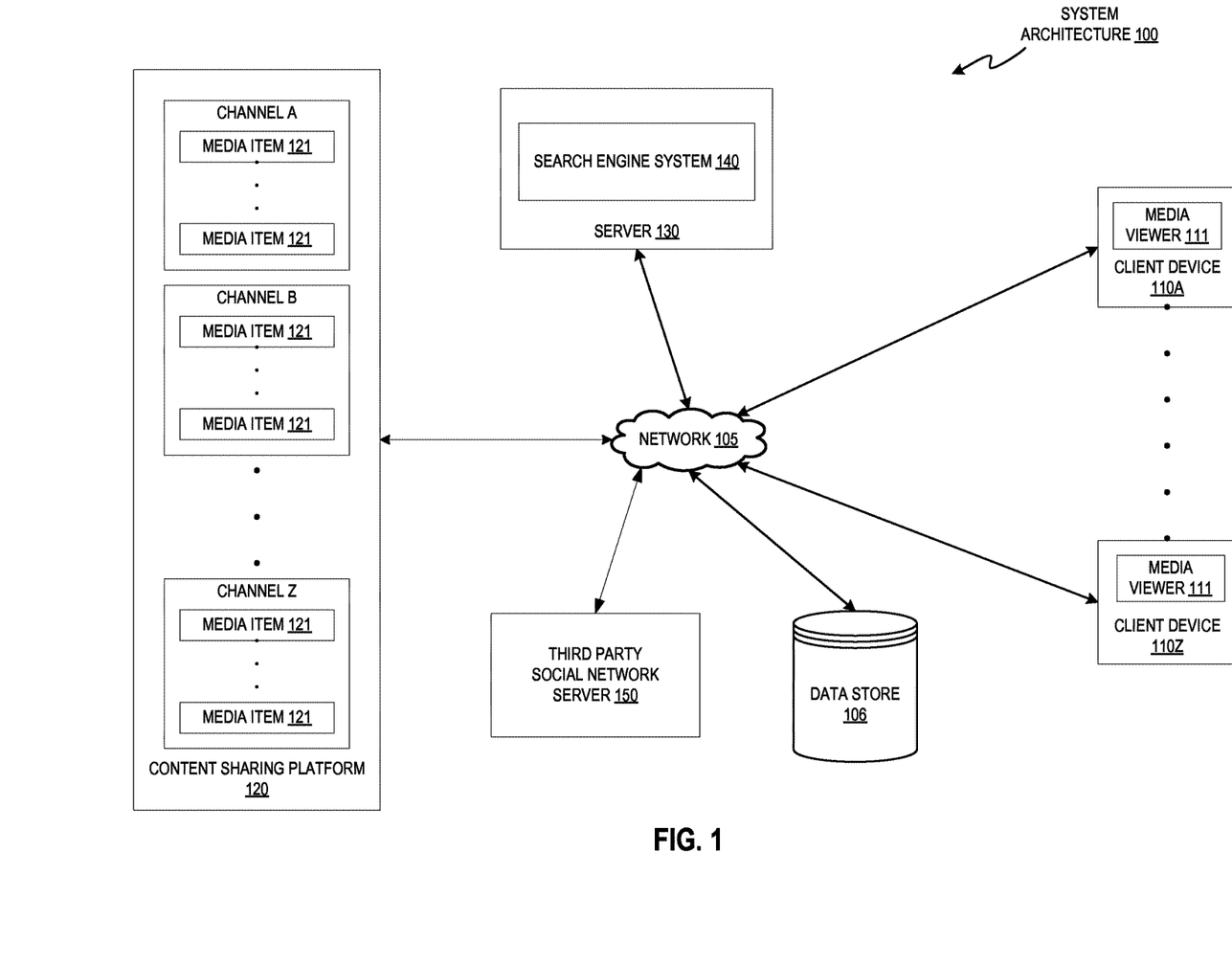
FIG. 1 illustrates an example system architecture, in accordance with one implementation of the disclosure.

FIG. 1 illustrates an example system architecture 100, in accordance with one implementation of the disclosure, for merging content channels of a content sharing platform. The system architecture 100 includes client devices 110A through 110Z, a network 105, a data store 106, a content sharing platform 120, and a server 130. In one implementation, network 105 may include a public network (e.g., the Internet), a private network (e.g., a local area network (LAN) or wide area network (WAN)), a wired network (e.g., Ethernet network), a wireless network (e.g., an 802.11 network or a Wi-Fi network), a cellular network (e.g., a Long Term Evolution (LTE) network), routers, hubs, switches, server computers, and/or a combination thereof. In one implementation, the data store 106 may be a memory (e.g., random access memory), a cache, a drive (e.g., a hard drive), a flash drive, a database system, or another type of component or device capable of storing data. The data store 106 may also include multiple storage components (e.g., multiple drives or multiple databases) that may also span multiple computing devices (e.g., multiple server computers).

The client devices 110A through 110Z may each include computing devices such as personal computers (PCs), laptops, mobile phones, smart phones, tablet computers, netbook computers etc. In some implementations, client device 110A through 110Z may also be referred to as "user devices." Each client device includes a media viewer 111. In one implementation, the media viewers 111 may be applications that allow users to view content, such as images, videos, web pages, documents, etc. For example, the media viewer 111 may be a web browser that can access, retrieve, present, and/or navigate content (e.g., web pages such as Hyper Text Markup Language (HTML) pages, digital media items, etc.) served by a web server. The media viewer 111 may render, display, and/or present the content (e.g., a web page, a media viewer) to a user. The media viewer 111 may also display an embedded media player (e.g., a Flash® player or an HTML5 player) that is embedded in a web page (e.g., a web page that may provide information about a product sold by an online merchant). In another example, the media viewer 111 may be a standalone application that allows users to view digital media items (e.g., digital videos, digital images, electronic books, etc.).

The media viewers 111 may be provided to the client devices 110A through 110Z by the server 130 and/or content sharing platform 120. For example, the media viewers 111 may be embedded media players that are embedded in web pages provided by the content sharing platform 120. In another example, the media viewers 111 may be applications that are downloaded from the server 130.

In general, functions described in one implementation as being performed by the content sharing platform 120 can also be performed on the client devices 110A through 110Z in other implementations if appropriate. In addition, the functionality attributed to a particular component can be performed by different or multiple components operating together. The content sharing platform 120 can also be accessed as a service provided to other systems or devices through appropriate application programming interfaces, and thus is not limited to use in websites.

In one implementation, the content sharing platform 120 may be one or more computing devices (such as a rackmount server, a router computer, a server computer, a personal computer, a mainframe computer, a laptop computer, a tablet computer, a desktop computer, etc.), data stores (e.g., hard disks, memories, databases), networks, software components, and/or hardware components that may be used to provide a user with access to media items and/or provide the media items to the user. For example, the content sharing platform 120 may allow a user to consume, upload, search for, approve of ("like"), dislike, and/or comment on media items. The content sharing platform 120 may also include a website (e.g., a webpage) that may be used to provide a user with access to the media items.

In implementations of the disclosure, a "user" may be represented as a single individual. However, other implementations of the disclosure encompass a "user" being an entity controlled by a set of users and/or an automated source. For example, a set of individual users federated as a community in a social network may be considered a "user". In another example, an automated consumer may be an automated ingestion pipeline, such as a topic channel, of the content sharing platform 120.

The content sharing platform 120 may include multiple channels (e.g., channels A through Z). A channel can be data content available from a common source or data content having a common topic, theme, or substance. The data content can be digital content chosen by a user, digital content made available by a user, digital content uploaded by a user, digital content chosen by a content provider, digital content chosen by a broadcaster, etc. For example, a channel X can include videos Y and Z. A channel can be associated with an owner, who is a user that can perform actions on the channel. Different activities can be associated with the channel based on the owner's actions, such as the owner making digital content available on the channel, the owner selecting (e.g., liking) digital content associated with another channel, the owner commenting on digital content associated with another channel, etc. The activities associated with the channel can be collected into an activity feed for the channel. Users, other than the owner of the channel, can subscribe to one or more channels in which they are interested. The concept of "subscribing" may also be referred to as "liking", "following", "friending", and so on.

Once a user subscribes to a channel, the user can be presented with information from the channel's activity feed. If a user subscribes to multiple channels, the activity feed for each channel to which the user is subscribed can be combined into a syndicated activity feed. Information from the syndicated activity feed can be presented to the user. Channels may have their own feeds. For example, when navigating to a home page of a channel on the content sharing platform, feed items produced by that channel may be shown on the channel home page. Users may have a syndicated feed, which is a feed comprised of at least a subset of the content items from all of the channels to which the user is subscribed. Syndicated feeds may also include content items from channels that the user is not subscribed. For example, the content sharing platform 120 or other social networks may insert recommended content items into the user's syndicated feed, or may insert content items associated with a related connection of the user in the syndicated feed.

Each channel may include one or more media items 121. Examples of a media item 121 can include, and are not limited to, digital video, digital movies, digital photos, digital music, website content, social media updates, electronic books (ebooks), electronic magazines, digital newspapers, digital audio books, electronic journals, web blogs, real simple syndication (RSS) feeds, electronic comic books, software applications, etc. In some implementations, media item 121 is also referred to as a media item.

A media item 121 may be consumed via the Internet and/or via a mobile device application. For brevity and simplicity, an online video (also hereinafter referred to as a video) is used as an example of a media item 121 throughout this document. As used herein, "media," "media item," "online media item," "digital media," "digital media item," "content," and "content item" can include an electronic file that can be executed or loaded using software, firmware or hardware configured to present the digital media item to an entity. In one implementation, the content sharing platform 120 may store the media items 121 using the data store 106.

In one implementation, the server 130 may be one or more computing devices (e.g., a rackmount server, a server computer, etc.). In one implementation, the server 130 may be included in the content sharing platform 120. The server 130 may include a search engine system 140. The search engine system 140 enables the promotion of preferred content in a search query in implementations of the disclosure. Preferred content may refer to one or more content items uploaded by a preferred user (e.g., a user owning content that they uploaded to their own channels on the content sharing platform). In some implementations, a preferred user is considered a partner or partner user of the content sharing platform. In other implementations, preferred content may include original uploads, uploads having a predetermined quality (e.g., resolution), and so on. Implementations of the disclosure may promote the preferred content in the context of preferred user-claimed content. Claimed content may refer to one or more content items uploaded by other users of the content sharing platform and claimed by the preferred user via a track or monetize policy. For example, a preferred user may own several content items about a certain topic and allow other users to upload copies of these content items with a monetization or track policy.

In some implementations, a user may submit a search query (e.g., via media viewer 111 of client device 110A-110Z) for specific content 121 hosted by the content sharing platform 120. Search engine system 140 may receive the search query and return a search result set of content items relevant to the search query. The content items in this search result set may be ranked in terms of relevancy to the search query. The search results set may also include both preferred content and claimed content that is relevant to the search query. As previously discussed, in such cases, it can be beneficial for both the preferred user and the search quality of the search result set to promote the preferred content or demote the claimed content items so that some claimed content items may end up below some preferred content items in the search result set. The search engine system 140 of implementations of the disclosure performs such promotions/demotions of the preferred content within the search result set. In implementations of the disclosure, the adjustments to the preferred content within the search result set may be performed by search engine system 140 to optimize the preferred user's value within the content sharing platform system without negatively effecting the search quality.

In some implementations, search engine system 140 of server 130 may interact with content sharing platform 120 and/or with other third party social network servers 150 to provide implementations of the disclosure. Further description of the search engine system 140 and its specific functions is described in more detail below with respect to FIG. 2.

Although implementations of the disclosure are discussed in terms of content sharing platforms and promoting social network sharing of a content item on the content sharing platform, implementations may also be generally applied to any type of social network providing connections between users. Implementations of the disclosure are not limited to content sharing platforms that provide channel subscriptions to users.

In situations in which the systems discussed here collect personal information about users, or may make use of personal information, the users may be provided with an opportunity to control whether the content sharing platform 120 collects user information (e.g., information about a user's social network, social actions or activities, profession, a user's preferences, or a user's current location), or to control whether and/or how to receive content from the content server that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by the content sharing platform 120.

Figure 2:
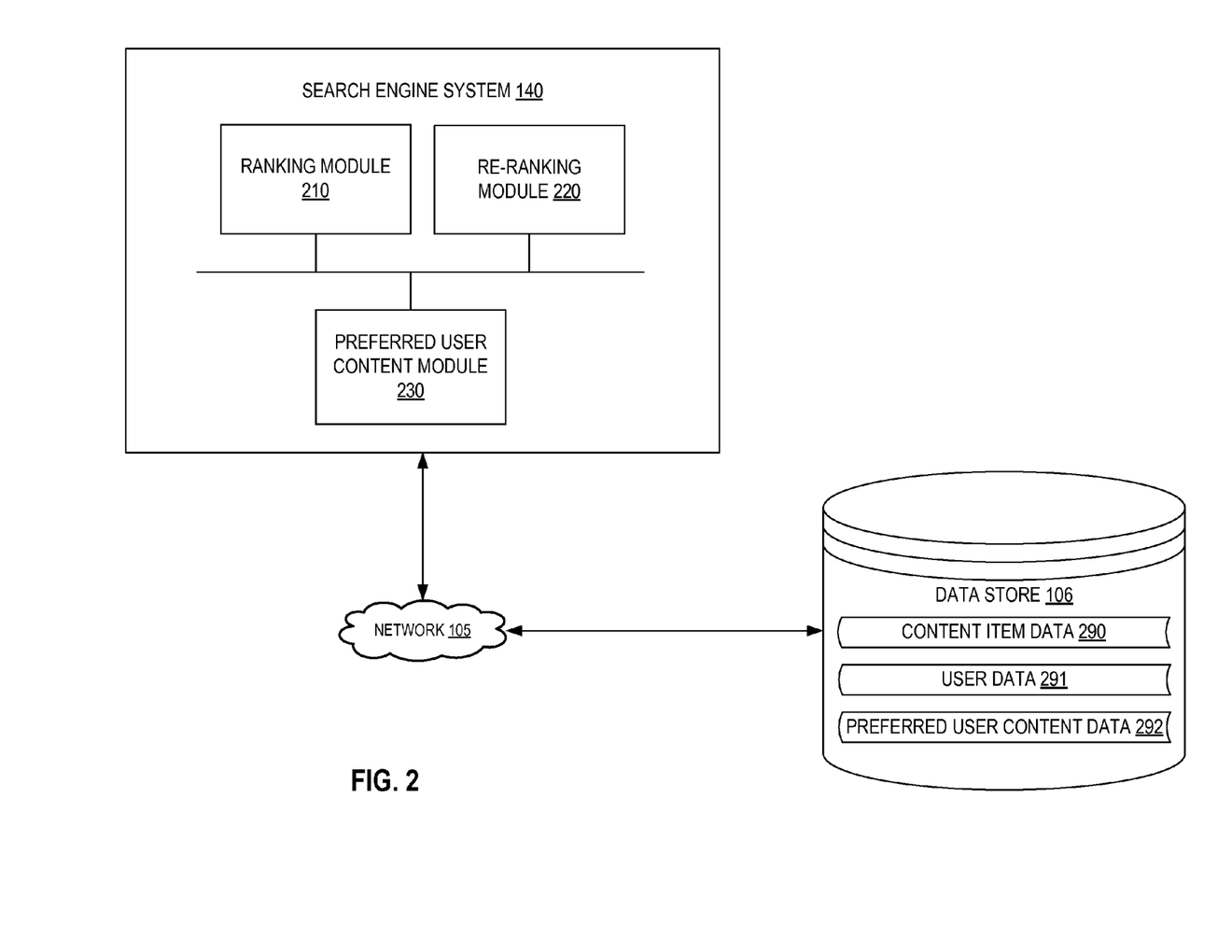
FIG. 2 is a block diagram illustrating a search engine system in accordance with one implementation of the disclosure.

FIG. 2 is a block diagram illustrating a search engine system 140 in accordance with one implementation of the disclosure. As discussed above, the search engine system 140 may interact with a single social network, or may be a utilized among multiple social networks (e.g., provided as a service of a content sharing platform that is utilized by other third party social networks). In one implementation, the search engine system 140 includes a ranking module 210, a re-ranking module 220, and a preferred user content module 230. More or less components may be included in the search engine system 140 without loss of generality. For example, two of the modules may be combined into a single module, or one of the modules may be divided into two or more modules. In one implementation, one or more of the modules may reside on different computing devices (e.g., different server computers, on a single client device, or distributed among multiple client devices, etc.). Furthermore, one or more of the modules may reside on different content sharing platforms, third party social networks, and/or external servers.

The search engine system 140 is communicatively coupled to the data store 106. For example, the search engine system 140 may be coupled to the data store 106 via a network (e.g., via network 105 as illustrated in FIG. 1). In another example, the search engine system 140 may be coupled directly to a server where the search engine system 140 resides (e.g., may be directly coupled to server 130). The data store 106 may be a memory (e.g., random access memory), a cache, a drive (e.g., a hard drive), a flash drive, a database system, or another type of component or device capable of storing data. The data store 106 may also include multiple storage components (e.g., multiple drives or multiple databases) that may also span multiple computing devices (e.g., multiple server computers). The data store 106 includes content item data 290, user data 291, and preferred user content data 292.

Figure 3A:
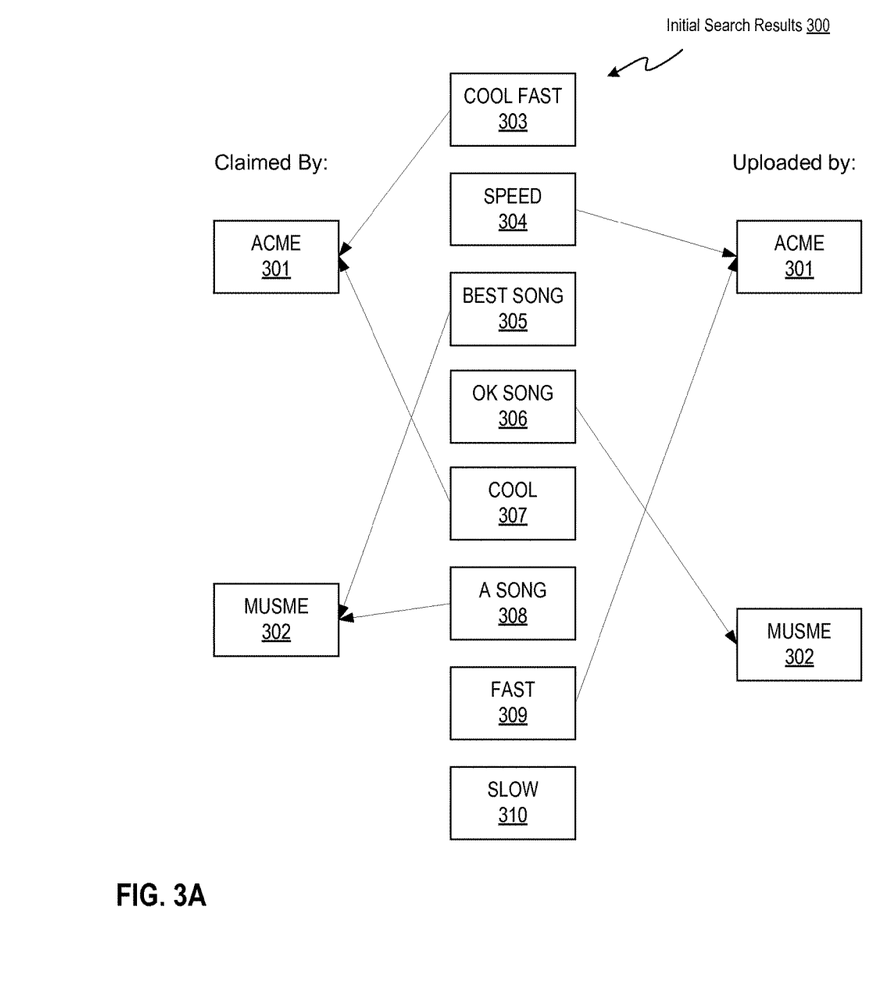
FIGS. 3A and 3B are block diagrams illustrating an example search query and search result rankings in accordance with one implementation of the disclosure.

As discussed above, the search engine system 140 enables the promotion of preferred content within search query results. Before describing the details of implementations of the disclosure, FIG. 3A is a block diagram illustrating initial search results 300 of a sample query: "cool fast song". Throughout this disclosure, it may be assumed that the topmost content item in search results has rank zero, and that less relevant results have higher ranks. Each content item in a search result may also have a "relevancy score" (e.g., a positive floating point number) corresponding to the content item. In one implementation, the "relevancy score" of a content item is the estimated relevancy of the item to the search query. As such, the content item with rank zero may have the highest relevancy score, the content item with rank one may have the next highest relevancy score, and so on.

The search query includes results from, among others, two fictional content owners "Acme" 301 and "Musme" 302. Some results are uploaded by these content owners ("Speed" 304, "Ok song" 306, and "Fast" 309), and other results are claimed by these content owners ("Cool fast" 303, "Best song" 305, "Cool" 307, and "A song" 308). As a preferred user, Acme 301 would prefer to promote "Speed" 304 over "Cool fast" 303 as Acme 301 uploaded "Speed" 304, but only has a claim over "Cool fast" 303, which was uploaded by a different user. Similarly, Musme 302 would prefer to promote "Ok song" 306 over "Best song" 305 as Musme 302 uploaded "Ok song" 306, but only has a claim over "Best song" 305, which was uploaded by a different user.

There are three stakeholders/considerations in the ranking of the search results: (1) search quality (i.e., the relevance of the results to the querying user), (2) the preferred user (e.g., Acme 301 or Musme 302), and (3) the uploader of the claimed (monetized or tracked) content item. While the search engine system 140 overall aims to optimize search quality (i.e., to provide as relevant search results as possible), the preferred content promotion performed by search engine system 140 in implementations of the disclosure aims to be neutral or positive in terms of search quality. Moreover, the preferred content promotion performed by search engine system 140 also aims to protect interests of the preferred user over the interests of the uploader of the claimed content item. Finally, as the uploader of the claimed content items fulfills an important role for the content sharing platform (e.g., by directing site users to the claimed videos), the preferred content promotion performed by search engine system 140 aims to protect the interests of the querying user whenever such an interest is not in conflict with the interests of the preferred user.

Figure 3B:
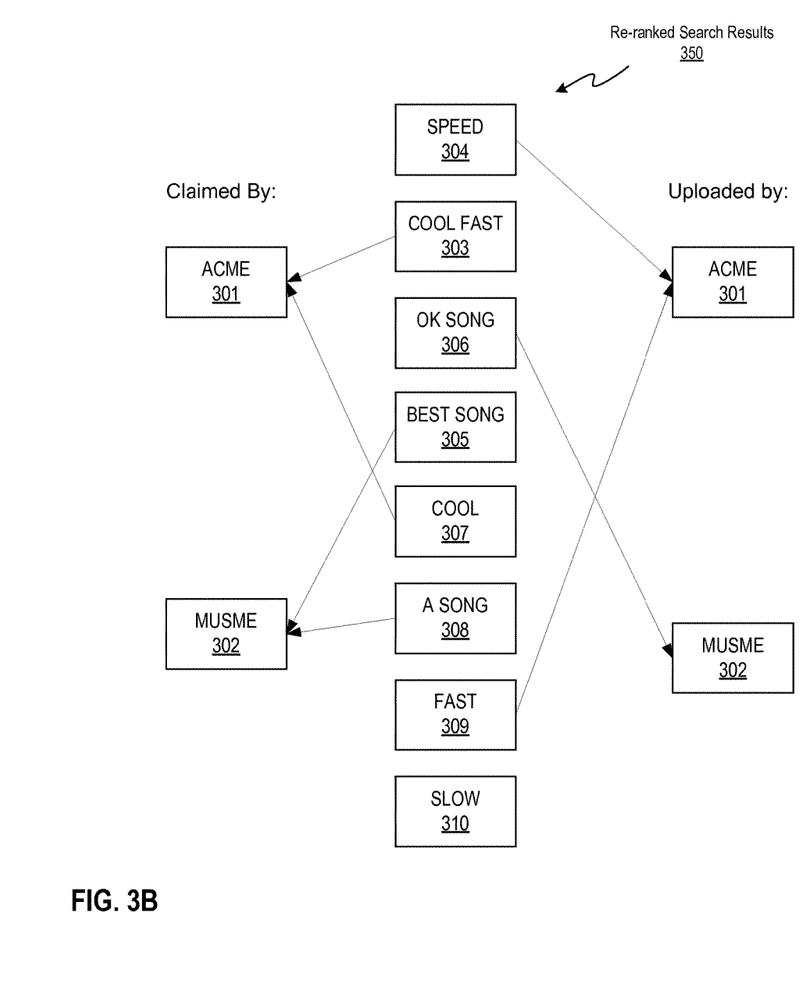

The search engine system 140 thus ranks the search results in a way that optimally promotes the preferred content items and/or optimally demotes claimed content items. Referring to FIG. 3B, a block diagram is shown of the re-ranked search results 350 for the sample query of FIG. 3A subsequent to the search engine system 140 applying preferred content promotions to the search results according to an implementation of the disclosure. With respect to Acme 301, "Cool fast" 303 may be demoted below "Speed" 304 (or "Speed" 304 may be promoted above "Cool fast" 303). With respect to Musme 302, "Best song" 305 may be demoted below "Ok song" 306 (or "Ok song" 306 may be promoted above "Best song" 305). It may be implementation-dependent on which content items are promoted/demoted with respect to other content items.

Referring back to FIG. 2, the search engine system 140 may perform promotions/demotions of content items in a search result to optimize each preferred user's value, while not negatively affecting search quality. Implementations of the disclosure include two parts: (1) collection of claim data and uploader data; and (2) heuristics for when to promote preferred content above claimed content.

In one implementation, preferred user content module 230 collects claim data and uploader data from different sources and combined into one database, the preferred user content data 292 of data store 106. This preferred user content data 292 may be updated in real-time, as new claims are made and new content items uploaded. This database 292 may be keyed by the ID of the content item and it is a "union" with two possibilities: an uploader owner ID, or a list of claimed owner IDs. Schematically: videoID>(uploaderID|claimed-ByID*). This data can possibly be annotated with further information, such as the "status", "tier", or "prestige" of the uploader, and the kind of claim, e.g., one of "video only", "audio only", "audio visual", or one of "manual", "based on a video/audio/AV match", etc.

When a querying user submits a search query for a content item, ranking module 210 identifies relevant content items from content item data 290 as a search result set. Ranking module 210 also ranks the content items within the search result set according to an initial ranking (e.g., such as shown in FIG. 3A). The initial ranking methodology is outside of the scope of the present disclosure.

Re-ranking module 220 may then examine the initial ranking and apply various optimizations (e.g. heuristics) to the rankings. In one implementation, re-ranking module 220 works in conjunction with preferred user content module 230 to adjust a position of the preferred content item (e.g., promote the preferred content or demote the claimed content) within the search result rankings and provides an updated ranking to the querying user as the search results. Re-ranking module 220 may adjust preferred content in the search results using various different heuristics, as described further below.

A first example heuristic is now described. If a content item at position X in an initial ranking of a search result is claimed by partner P (i.e., a preferred user), and partner P uploaded the content item at position X+1, then the re-ranking module 220 interchanges the position of these two content items. In one implementation, an exception can be made when the difference or ratio in score between X and X+1 is above some large threshold. In this case, it makes no difference if the interchange of X and X+1 is viewed as a promotion of X+1 over X, or as a demotion of X below X+1. A more aggressive preferred content promotion can be achieved by applying the same logic to content items at position X+n for some number n, e.g., n=7.

A second example heuristics includes boosting a content item, X, uploaded by a partner P with a factor F depending on the number, position, and score of any content items claimed by P that appear in the search results. There are several possibilities for computing the boost factor, F. For example, X could be boosted by a multiplier M, e.g., M=1.2, for each content item claimed by P that is ranked above X, or for all content items claims by P in the rankings. In another example, M may be computed as a power of the sum of the scores of all content items claimed by P, where may may also be capped by an arbitrary value, such as M between 1 and 6. As a result, X's boost would be M raised to the power # {videos above X claimed by P}. In other implementations, all content items Xi, where i is equal to 1, 2, 3 . . . N, uploaded by partner P may be boosted by the factor F.

In some implementations, the boost factor F is applied to a score associated with the preferred content items. As previously discussed, the "score" of a content item is the estimated relevancy of the item to the search query. This boost may or may not turn out to actually reorder the results in the initially ranking. However, even if the boosts of the preferred content items do not directly reorder results, the boosts may still have an impact on a final ordering of the search results through interaction with other search result optimizations that the search engine system 140 may apply to the search results.

In other implementations, the multiplier M may be a function of the partner user, P, so that a more trustworthy preferred user (i.e., a partner with generally high quality content) receives a higher boost. Furthermore, content item X may receive a fixed boost or a boost depending on if partner P has a claimed video above X (or above or below it).

In a third heuristic, which may be utilized in combination with the first or second heuristics, content items claimed by a partner P may be "demoted." For example, a claimed content item for partner P may be "boosted" with a multiplier 0<M<1. Since M is less than 1, the "boost" to the claimed content item is effectively a demotion in the rankings of the search results.

A fourth example heuristic is designed to "demote" claimed content by optimizing the partner's, P's, utility, under the assumption that the partner is empowered to demote claimed content items, but not empowered to promote his or her own content items. Each partner P may be assigned a number $1<V_P$ describing how much more the partner values a view on a content item uploaded on the partner's channel, as compared to a view on a content item claimed by the partner. For example, $V_P=5$, would imply that P gives five times more value to a view on a content item uploaded on one of his or her own channels, as compared to a view on a claimed content item. Note that $V_P$ may not necessarily be related to a directly-computable monetary amount: rather, the partner could pick a high number $V_P$ to promote his or her own channel for long term gain (e.g., to get more subscribers to his channels).

Each content item includes a rank R (e.g., 0<=R<100). Subsequently, each content item ranked R is assigned an average chance, C[R,] that a user selects a search result in this ranking position. For example C[0]=30%, C[1]=20%, C[2]=15%, C[3]=10%, C[4]=8%, . . . C[99]=0.05%. Note that the sum C[0]+ . . . +C[99] should be 100%. It may be assumed that C[i] is strictly decreasing with increasing search rank. A partner utility, $U_P$, is then assigned for a given content item ranking as follows:

$$U_P = V_P \times \text{Sum}\{C[i]: i \text{ uploaded by } P\} + \text{Sum}\{C[j]: j \text{ claimed by } P\}.$$

The partner utility, $U_P$, is the value that the partner would like to optimize. The optimum value of $U_P$ is achieved when all content items uploaded by P are on top of the rankings with all content items claimed by P immediately following. However, this is typically not a valid re-ranking. Instead, the re-ranking module 220 optimizes $U_P$ by demoting solely claimed content items. It should be noted that as $V_P$ approaches infinity, content items claimed by P are unconditionally demoted below P's uploaded videos. Moreover, if the value of $V_P$ is slightly above or close to 1, this fourth heuristic example degenerates to be the same as the first example heuristic described above.

Figure 4:
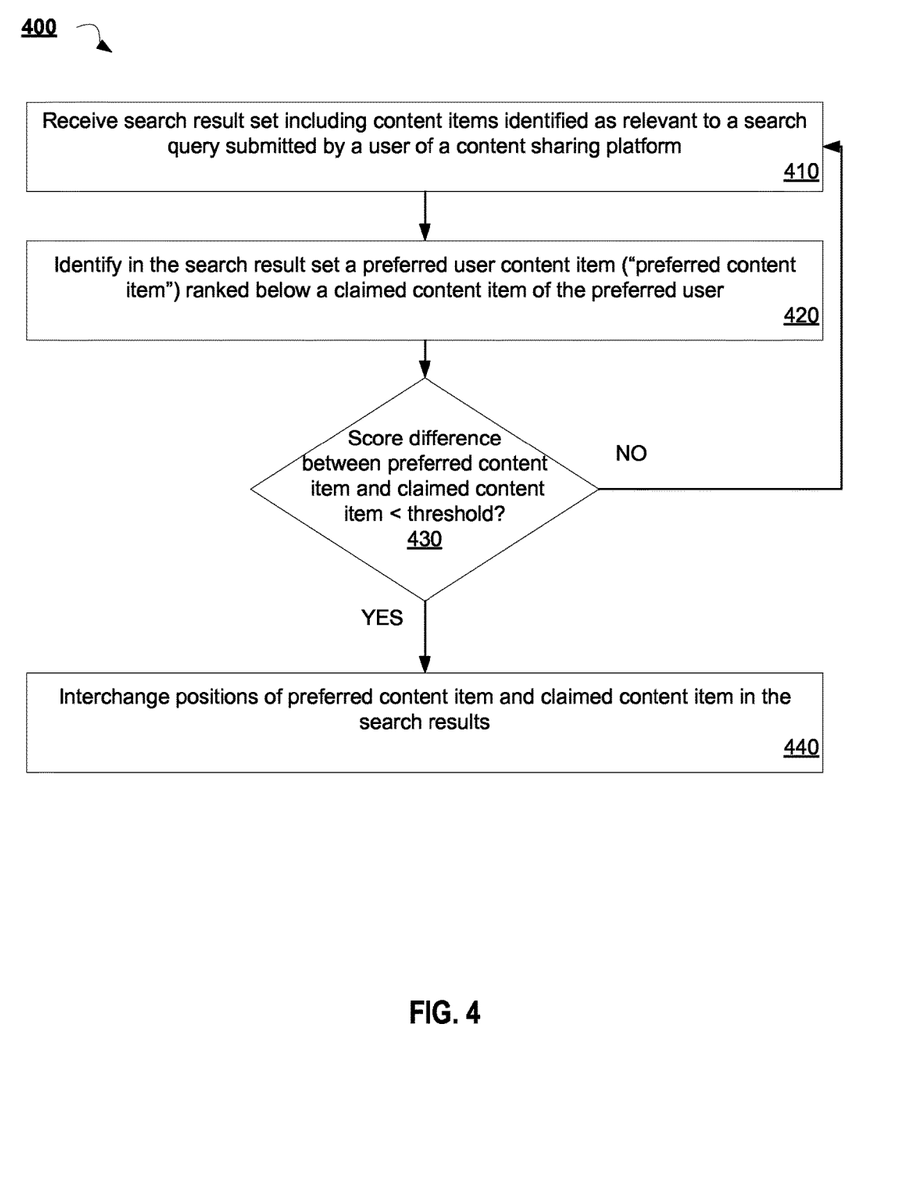
FIG. 4 is a flow diagram illustrating a method for promoting preferred content in a search query according to some implementations of the disclosure.

FIG. 4 is a flow diagram illustrating a method 400 for promoting preferred content in a search query according to some implementations of the disclosure. The method 400 may be performed by processing logic that comprises hardware (e.g., circuitry, dedicated logic, programmable logic, microcode, etc.), software (e.g., instructions run on a processing device to perform hardware simulation), or a combination thereof.

For simplicity of explanation, the methods of this disclosure are depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term "article of manufacture," as used herein, is intended to encompass a computer program accessible from any computer-readable device or storage media. In one implementation, method 400 may be performed by search engine system 140 as shown in FIGS. 1 and 2.

Referring to FIG. 4, method 400 begins at block 410 when a search result set is received. In one implementation, the search result set includes content items of a content sharing platform that are identified as being relevant to a search query submitted by a user of the content sharing platform. Then, at block 420, a preferred user content item ("preferred content item") ranked below a claimed content item of the preferred user is identified in the search result set.

At decision block 430, it is determined whether a score difference between scores of the preferred content item and the claim content item are less than a threshold score differential value. If not, method 400 returns back to block 410 to continue processing search result sets. If the score difference is less than the threshold score differential value, then method 400 proceeds to block 440. At block 440, the positions of the preferred content item and the claim content item in the search result rankings are interchanged so that the preferred content item is now ranked above the claimed content item.

Figure 5:
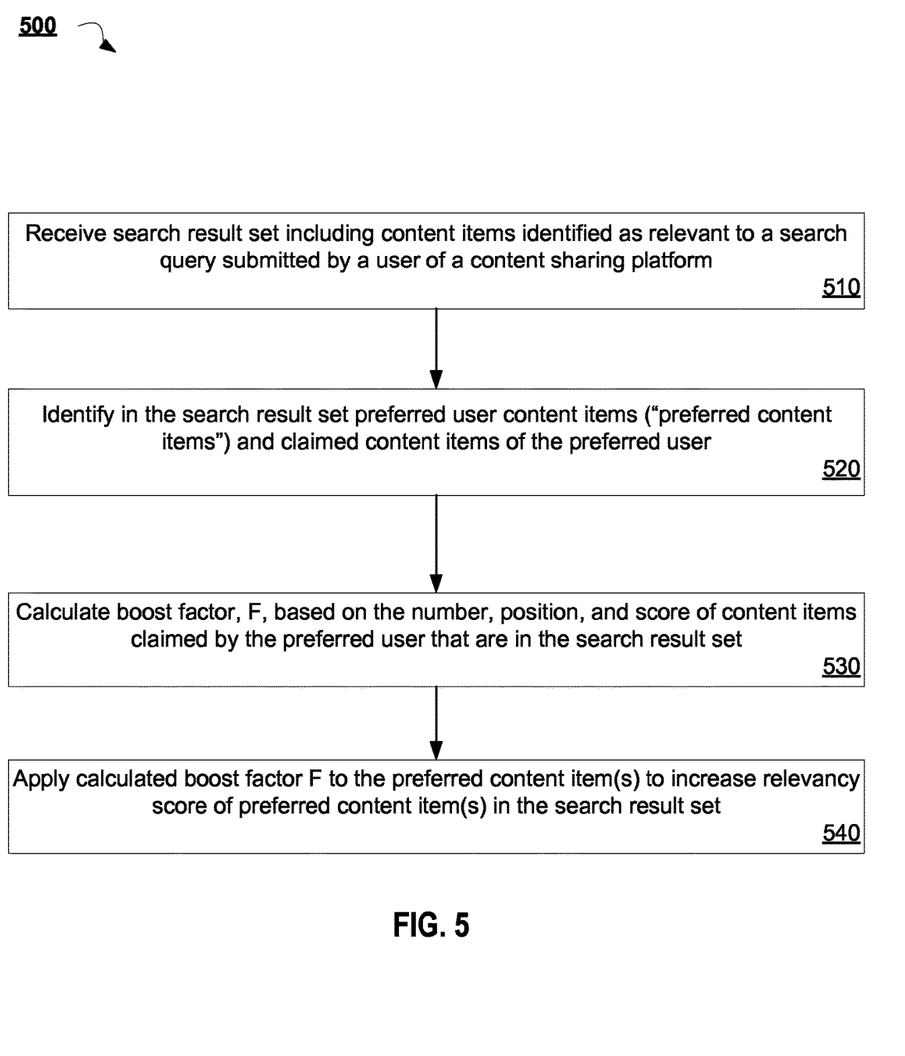
FIG. 5 is a flow diagram illustrating another method for promoting preferred content in a search query according to some implementations of the disclosure.

FIG. 5 is a flow diagram illustrating another method 500 for promoting preferred content in a search query according to some implementations of the disclosure. The method 400 may be performed by processing logic that comprises hardware (e.g., circuitry, dedicated logic, programmable logic, microcode, etc.), software (e.g., instructions run on a processing device to perform hardware simulation), or a combination thereof. In one implementation, method 500 may be performed by search engine system 140 as shown in FIG. 1.

Referring to FIG. 5, method 500 begins at block 510 when a search result set is received. In one implementation, the search result set includes content items of a content sharing platform that are identified as being relevant to a search query submitted by a user of the content sharing platform. Then, at block 520, preferred user content items ("preferred content items") and claimed content items of the preferred user are identified in the search result set.

Subsequently, at block 530, a boost factor, F, is calculated based on the number position, and score of content items claimed by P that are in the search result set. Then, at block 540, the calculated boost factor, F, is applied to the preferred content item to increase a relevancy score of the preferred content item(s) in the search result set. In some implementations, the boost factor F is applied to the top-ranked preferred content item in the search result set, while in other implementations the boost factor F is applied to all preferred content items in the search result set. As previously discussed, the "relevancy score" of a content item is the estimated relevancy of the item to the search query. In some implementations, the all content items Xi, where i equal to 1, 2, 3, ... N, uploaded by the preferred user may be boosted by the factor F.

In some implementations, the boost may or may not turn out to actually reorder the results in the initially ranking. However, even if the boosts of the preferred content items do not directly reorder results, the boosts may still have an impact on a final ordering of the search results through interaction with other search result optimizations that the search engine system 140 may apply to the search results.

Figure 6:
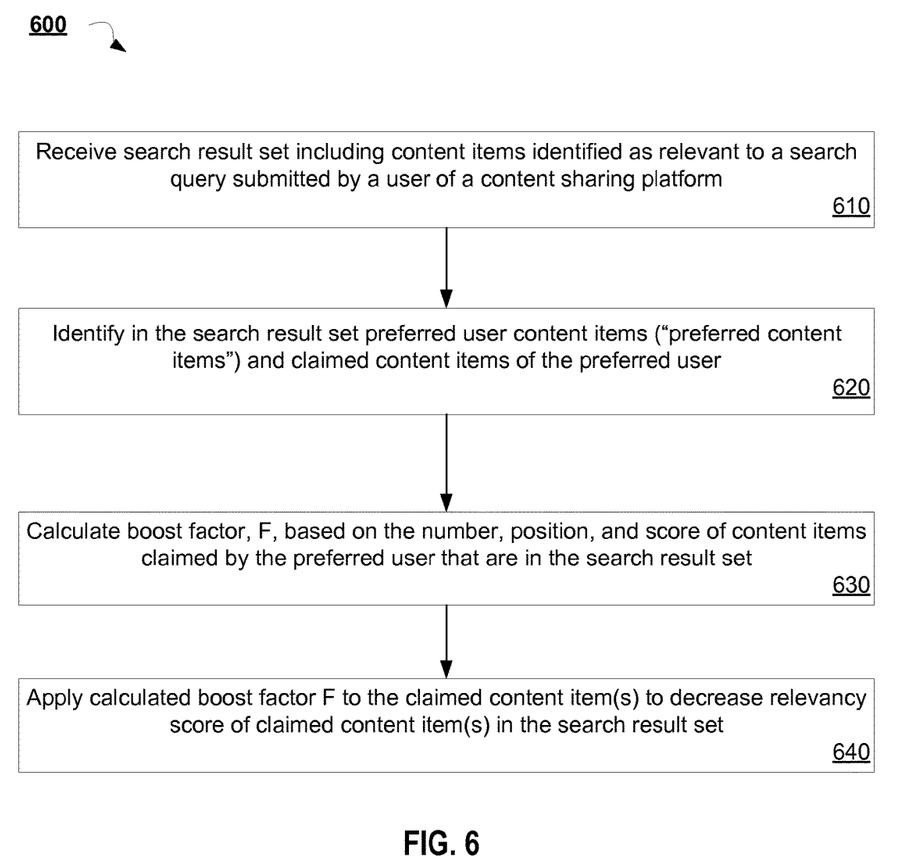
FIG. 6 is a flow diagram illustrating another method for promoting preferred content in a search query according to some implementations of the disclosure.

FIG. 6 is a flow diagram illustrating another method 600 for promoting preferred content in a search query according to some implementations of the disclosure. The method 600 may be performed by processing logic that comprises hardware (e.g., circuitry, dedicated logic, programmable logic, microcode, etc.), software (e.g., instructions run on a processing device to perform hardware simulation), or a combination thereof. In one implementation, method 600 may be performed by search engine system 140 as shown in FIG. 1.

Referring to FIG. 6, method 600 begins at block 610 when a search result set is received. In one implementation, the search result set includes content items of a content sharing platform that are identified as being relevant to a search query submitted by a user of the content sharing platform. Then, at block 620, preferred user content items ("preferred content items") and claimed content items of the preferred user are identified in the search result set.

Subsequently, at block 630, a boost factor, F, is calculated based on the number position, and score of content items claimed by the preferred user that are in the search result set. Then, at block 640, the calculated boost factor, F, is applied to the claimed content item(s) to decrease a relevancy score of the claimed content item(s) in the search result set.

Figure 7:
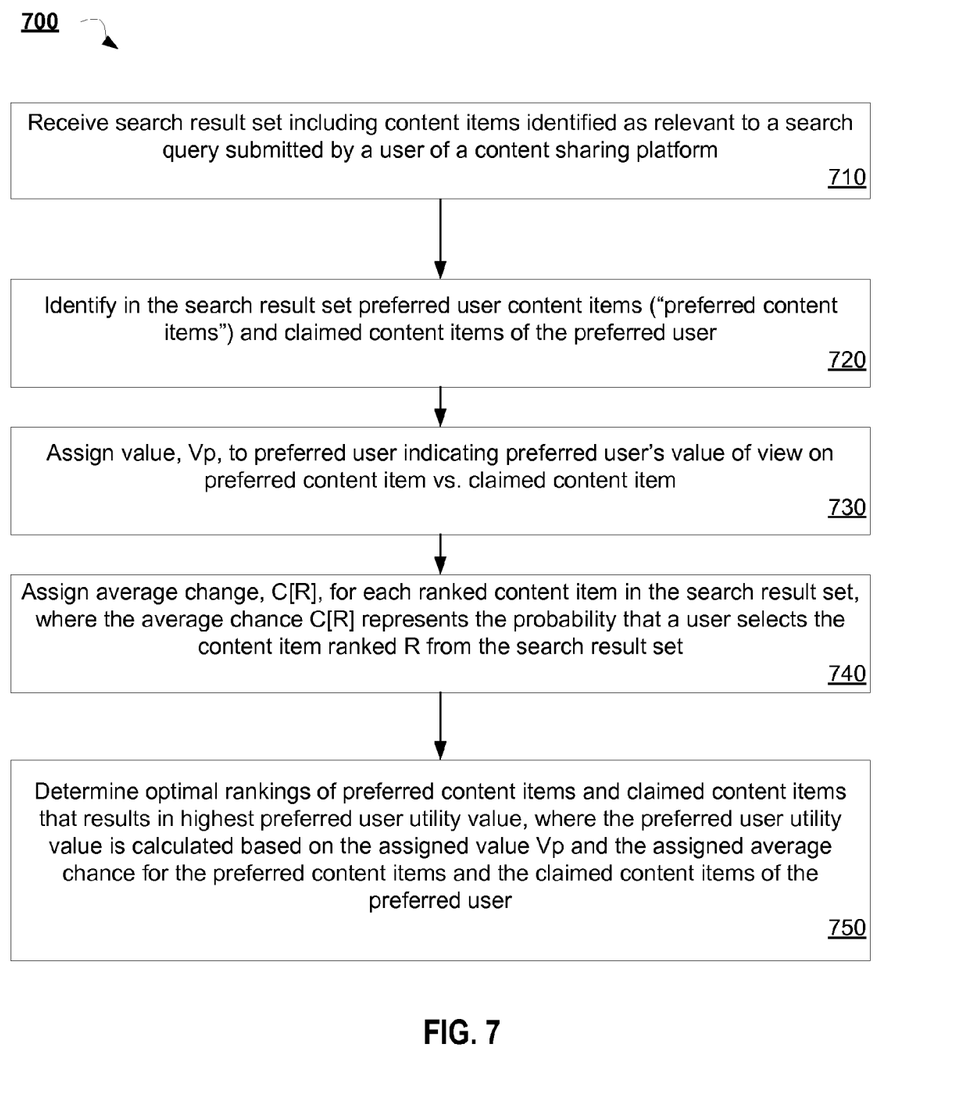
FIG. 7 is a flow diagram illustrating another method for promoting preferred content in a search query according to some implementations of the disclosure.

FIG. 7 is a flow diagram illustrating another method 700 for promoting preferred content in a search query according to some implementations of the disclosure. The method 700 may be performed by processing logic that comprises hardware (e.g., circuitry, dedicated logic, programmable logic, microcode, etc.), software (e.g., instructions run on a processing device to perform hardware simulation), or a combination thereof. In one implementation, method 700 may be performed by search engine system 140 as shown in FIG. 1.

Referring to FIG. 7, method 700 begins at block 710 when a search result set is received. In one implementation, the search result set includes content items of a content sharing platform that are identified as being relevant to a search query submitted by a user of the content sharing platform. Then, at block 720, preferred user content items ("preferred content items") and claimed content items of the preferred user are identified in the search result set.

Subsequently, at block 730, a value, $V_p$, is assigned to the preferred user. In one implementation, the value $V_p$ indicates the preferred user's value of a view on the preferred content item versus a view of a claimed content item of the preferred user. At block 740, an average change, C[R], is assigned to each rank of the search result set. The average chance C[R]

represents the probability that a user selects the content item ranked R from the search result set.

Lastly, at block 750, optimal rankings of the preferred content items and claimed content items are determined that results in a highest preferred user utility value, $U_p$. In one implementation, the preferred user utility value, $U_p$, is calculated based on the assigned value $V_p$ and the assigned average chance, C[R] for the preferred content items and the claim content items according to how the content items are placed in the search result rankings.

Figure 8:
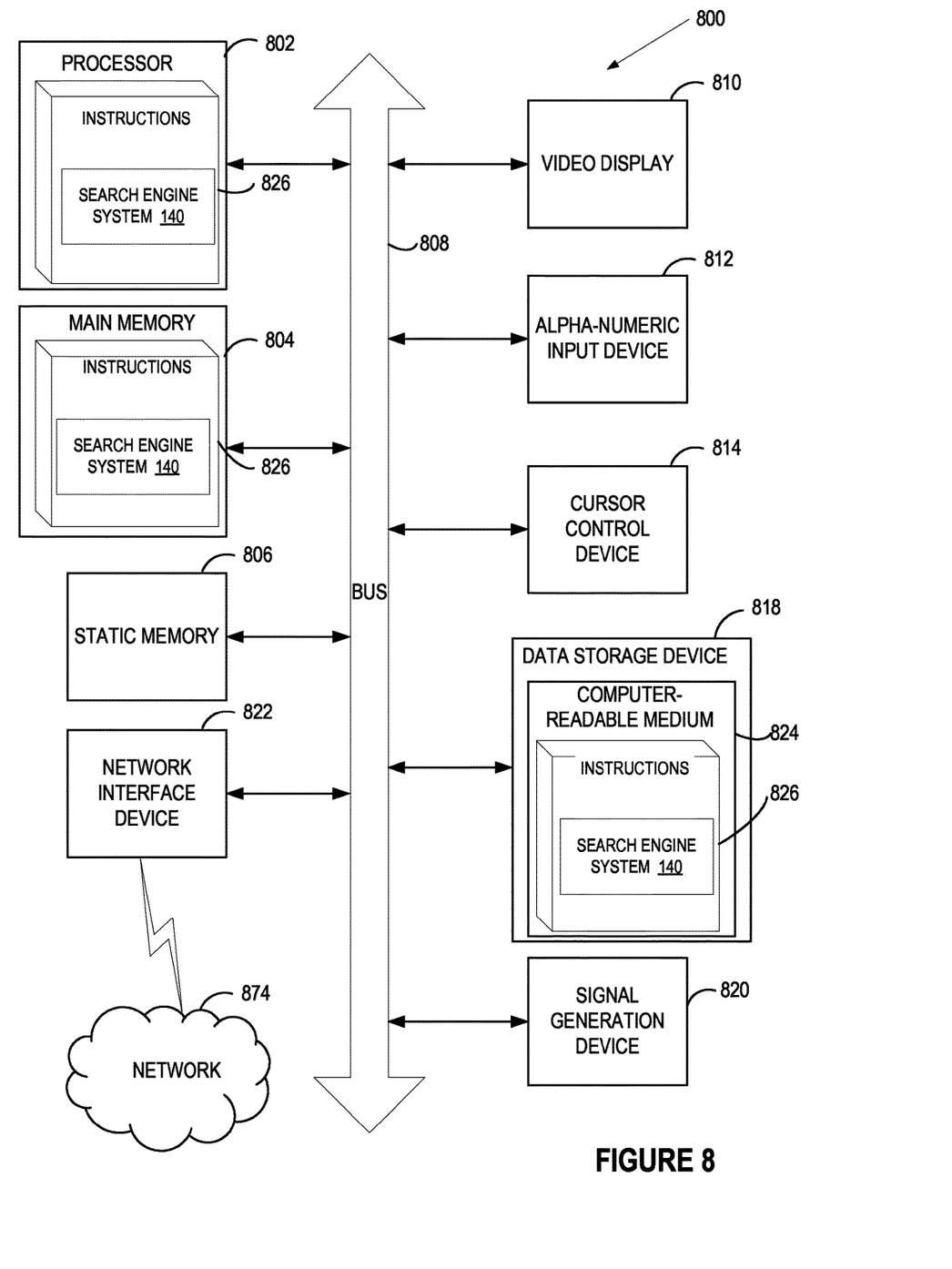
FIG. 8 is a block diagram illustrating an exemplary computer system, according to some implementations.

FIG. 8 illustrates a diagrammatic representation of a machine in the exemplary form of a computer system 800 within which a set of instructions, for causing the machine to perform any one or more of the methodologies discussed herein, may be executed. In alternative implementations, the machine may be connected (e.g., networked) to other machines in a LAN, an intranet, an extranet, or the Internet. The machine may operate in the capacity of a server or a client machine in client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 800 includes a processing device (processor) 802, a main memory 804 (e.g., read-only memory (ROM), flash memory, dynamic random access memory (DRAM) such as synchronous DRAM (SDRAM) or Rambus DRAM (RDRAM), etc.), a static memory 806 (e.g., flash memory, static random access memory (SRAM), etc.), and a data storage device 818, which communicate with each other via a bus 808.

Processor 802 represents one or more general-purpose processing devices such as a microprocessor, central processing unit, or the like. More particularly, the processor 802 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processor 802 may also be one or more special-purpose processing devices such as an application specific integrated circuit (ASIC), a field programmable gate array (FPGA), a digital signal processor (DSP), network processor, or the like. The processor 802 is configured to execute instructions 826 for performing the operations and steps discussed herein.

The computer system 800 may further include a network interface device 822. The computer system 800 also may include a video display unit 810 (e.g., a liquid crystal display (LCD), a cathode ray tube (CRT), or a touch screen), an alphanumeric input device 812 (e.g., a keyboard), a cursor control device 814 (e.g., a mouse), and a signal generation device 820 (e.g., a speaker).

The data storage device 818 may include a computer-readable storage medium 824 on which is stored one or more sets of instructions 826 (e.g., software) embodying any one or more of the methodologies or functions described herein. The instructions 826 may also reside, completely or at least partially, within the main memory 804 and/or within the processor 802 during execution thereof by the computer system 800, the main memory 804 and the processor 802 also constituting computer-readable storage media. The instructions 826 may further be transmitted or received over a network 874 via the network interface device 822.

In one implementation, the instructions 826 include instructions for a search engine system 140, which may correspond, respectively, to its identically-named counterpart described with respect to FIGS. 1 and 2, and/or a software library containing methods for promoting preferred content in a search query. While the computer-readable storage medium 824 is shown in an exemplary implementation to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present disclosure. The term "computer-readable storage medium" shall accordingly be taken to include, but not be limited to, solid-state memories, optical media, and magnetic media.

In the foregoing description, numerous details are set forth. It will be apparent, however, to one of ordinary skill in the art having the benefit of this disclosure, that the present disclosure may be practiced without these specific details. In some instances, well-known structures and devices are shown in block diagram form, rather than in detail, in order to avoid obscuring the present disclosure.

Some portions of the detailed description have been presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "segmenting", "analyzing", "determining", "enabling", "identifying," "modifying" or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

The disclosure also relates to an apparatus for performing the operations herein. This apparatus may be specially constructed for the required purposes, or it may include a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

The words "example" or "exemplary" are used herein to mean serving as an example, instance, or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such.

Reference throughout this specification to "one embodiment" or "an embodiment" means that a particular feature, structure, or characteristic described in connection with the embodiment is included in at least one embodiment. Thus, the appearances of the phrase "in one embodiment" or "in an embodiment" in various places throughout this specification are not necessarily all referring to the same embodiment. In addition, the term "or" is intended to mean an inclusive "or" rather than an exclusive "or."

It is to be understood that the above description is intended to be illustrative, and not restrictive. Many other embodiments will be apparent to those of skill in the art upon reading and understanding the above description. The scope of the disclosure should, therefore, be determined with reference to the appended claims, along with the full scope of equivalents to which such claims are entitled.

What is claimed is:

1. A method comprising:
    obtaining a search result set of content items from a corpus of content items of a content sharing platform, the search result set responsive to a search query and comprising a rank of the content items;
    identifying content items in the search result set, the identified content items comprising at least:
        a preferred content item of a user, the preferred content item uploaded by the user; and
        a claimed content item of the user, the claimed content item is identified as claimed by the user and uploaded by another user, wherein use of the claimed content item is monitored based on a claimed content policy of the content sharing platform;
    adjusting, by a processing device, a position of the preferred content item with respect to a position of the claimed content item in the rank of the content items within the search result set, wherein adjusting the position comprises:
        determining that a difference in relevancy score attributed to each of the preferred content item and the claimed content item for the rank is less than or equal to a threshold difference value; and
        improving, based on determining that the difference is less than or equal to the threshold difference value, a first position of the preferred content item in the rank relative to a second position of the claimed content item in the rank.

2. The method of claim 1, wherein the corpus of content items is maintained by a content sharing platform associated with the user and the another user.

3. The method of claim 1, wherein the adjusting the position of the preferred content item in the rank further comprises interchanging the positions of the preferred content item and the claimed content item in the rank of the content items.

4. The method of claim 3, wherein the interchanging occurs when the difference in the relevancy score attributed to each of the preferred content item and the claimed content item for the rank is less than or equal to the threshold difference value.

5. The method of claim 1, wherein the adjusting the position of the preferred content item in the rank further comprises increasing a relevancy score of the preferred content item by a boost factor that is calculated based on another relevancy score attributed to the claimed content item for the rank, wherein the relevancy score of the preferred content item corresponds to a position of the preferred content item in the rank, and wherein the another relevancy score of the claimed content item corresponds to a position of the claimed content item in the rank.

6. The method of claim 5, wherein the content items in the search result set comprise more than one claimed content item claimed by the user, and wherein the boost factor is calculated based on the sum of the relevancy scores attributed to each of the more than one claimed content items, positions of the more than one content items in the rank, and the position of the preferred content item in the rank.

7. The method of claim 1, wherein the adjusting the position of the preferred content item in the rank further comprises demoting the claimed content item.

8. The method of claim 7, wherein the demoting the claimed content item further comprises reducing a relevancy score of the claimed content item by a multiplier that is less than one, wherein the relevancy score of the claimed content item corresponds to a position of the claimed content item in the rank.

9. The method of claim 1, wherein the adjusting the position of the preferred content item in the rank further comprises assigning the positions of the preferred content item and the claimed content item in the rank based on a function that optimizes a utility of the user that is based on a value that the user applies to a view on a content item uploaded by the user as compared to a view on a content item claimed by the user.

10. An apparatus comprising:
    a memory; and
    a processing device communicably coupled to the memory, the processing device to execute instructions to:
        obtain a search result set of content items from a corpus of content items of a content sharing platform, the search result set responsive to a search query and comprising a rank of the content items;
        identify content items in the search result set, the identified content items comprising at least:
            a preferred content item of a user, the preferred content item uploaded by the user; and a claimed content item of the user, the claimed content item is identified as claimed by the user and uploaded by another user, wherein use of the claimed content item is monitored based on a claimed content policy of the content sharing platform;

adjust a position of the preferred content item with respect to a position of the claimed content item in the rank of the content items within the search result set, wherein adjusting the position comprises:

determining that a difference in relevancy score attributed to each of the preferred content item and the claimed content item for the rank is less than or equal to a threshold difference value; and improving, based on determining that the difference is less than or equal to the threshold difference value, a first position of the preferred content item in the rank relative to a second position of the claimed content item in the rank.

11. The apparatus of claim 10, wherein the corpus of content items is maintained by a content sharing platform associated with the user and the another user.

12. The apparatus of claim 10, wherein the adjusting the position of the preferred content item in the rank further comprises interchanging the positions of the preferred content item and the claimed content item in the rank of the content items.

13. The apparatus of claim 10, wherein the adjusting the position of the preferred content item in the rank further comprises increasing a relevancy score of the preferred content item by a boost factor that is calculated based on another relevancy score attributed to the claimed content item for the rank, wherein the relevancy score of the preferred content item corresponds to a position of the preferred content item in the rank, and wherein the another relevancy score of the claimed content item corresponds to a position of the claimed content item in the rank.

14. The apparatus of claim 10, wherein the adjusting the position of the preferred content item in the rank further comprises demoting the claimed content item by reducing a relevancy score of the claimed content item by a multiplier that is less than one, wherein the relevancy score of the claimed content item corresponds to a position of the claimed content item in the rank.

15. The apparatus of claim 10, wherein the adjusting the position of the preferred content item in the rank further comprises assigning the positions of the preferred content item and the claimed content item in the rank based on a function that optimizes a utility of the user, the utility of the user based on a value that the user applies to a view on a content item uploaded by the user as compared to a view on a content item claimed by the user.

16. A non-transitory machine-readable storage medium storing instructions which, when executed, cause a processing device to perform operations comprising:

obtaining a search result set of content items from a corpus of content items of a content sharing platform, the search result set responsive to a search query and comprising a rank of the content items;

identifying content items in the search result set, the identified content items comprising at least:

a preferred content item of a user, the preferred content item uploaded by the user; and a claimed content item of the user, the claimed content item is identified as claimed by the user and uploaded by another user, wherein use of the claimed content item is monitored based on a claimed content policy of the content sharing platform;

adjusting, by the processing device, a position of the preferred content item with respect to a position of the claimed content item in the rank of the content items within the search result set, wherein adjusting the position comprises:

determining that a difference in relevancy score attributed to each of the preferred content item and the claimed content item for the rank is less than or equal to a threshold difference value; and improving, based on determining that the difference is less than or equal to the threshold difference value, a first position of the preferred content item in the rank relative to a second position of the claimed content item in the rank.

17. The non-transitory machine-readable storage medium of claim 16, wherein the corpus of content items is maintained by a content sharing platform associated with the user and the another user.

18. The non-transitory machine-readable storage medium of claim 16, wherein the adjusting the position of the preferred content item in the rank further comprises interchanging the positions of the preferred content item and the claimed content item in the rank of the content items.

19. The non-transitory machine-readable storage medium of claim 16, wherein the adjusting the position of the preferred content item in the rank further comprises increasing a relevancy score of the preferred content item by a boost factor that is calculated based on another relevancy score attributed to the claimed content item for the rank, wherein the relevancy score of the preferred content item corresponds to a position of the preferred content item in the rank, and wherein the another relevancy score of the claimed content item corresponds to a position of the claimed content item in the rank.

20. The non-transitory machine-readable storage medium of claim 16, wherein the adjusting the position of the preferred content item in the rank further comprises demoting the claimed content item.

21. The non-transitory machine-readable storage medium of claim 16, wherein the adjusting the position of the preferred content item in the rank further comprises assigning the positions of the preferred content item and the claimed content item in the rank based on a function that optimizes a utility of the user, the utility of the user based on a value that the user applies to a view on a content item uploaded by the user as compared to a view on a content item claimed by the user.

* * * * *